US00RE39476E

(19) United States
(12) Reissued Patent
Brown et al.

(10) Patent Number: US RE39,476 E
(45) Date of Reissued Patent: Jan. 23, 2007

(54) TIN ELECTROLYTE

(75) Inventors: Neil D. Brown, Merrick, NY (US); George A. Federman, Northport, NY (US); Angelo B. Chirafisi, Howard Beach, NY (US); Gregory Lai, West Babylon, NY (US)

(73) Assignee: Shipley Company, L.L.C., Marlborough, MA (US)

(21) Appl. No.: 11/032,658

(22) Filed: Jan. 10, 2005

Related U.S. Patent Documents

Reissue of:
(64) Patent No.: 6,322,686
Issued: Nov. 27, 2001
Appl. No.: 09/540,359
Filed: Mar. 31, 2000

(51) Int. Cl.
*C25D 3/60* (2006.01)
*C25D 3/30* (2006.01)
*C25D 3/32* (2006.01)

(52) U.S. Cl. ..... 205/253; 205/252; 205/300; 205/302

(58) Field of Classification Search ..... None
See application file for complete search history.

(56) References Cited

U.S. PATENT DOCUMENTS

| | | | | | |
|---|---|---|---|---|---|
| 4,168,223 | A | * | 9/1979 | Igarashi et al. | |
| 4,617,097 | A | * | 10/1986 | Nobel et al. | 205/254 |
| 4,701,244 | A | * | 10/1987 | Nobel et al. | |
| 4,717,460 | A | * | 1/1988 | Nobel et al. | |
| 5,110,423 | A | * | 5/1992 | Little et al. | |
| 5,174,887 | A | * | 12/1992 | Federman et al. | |
| 5,871,631 | A | * | 2/1999 | Ichiba et al. | |
| 5,951,841 | A | * | 9/1999 | Wehlage et al. | |
| 6,508,927 | B2 | * | 1/2003 | Yanada et al. | 205/241 |

FOREIGN PATENT DOCUMENTS

| | | |
|---|---|---|
| EP | 0 350 387 | 1/1990 |
| EP | 0 810 303 | 12/1997 |
| GB | 1 215 696 | 12/1970 |

OTHER PUBLICATIONS

Principles of Polymer Chemistry, Paul J. Flory: pp. 35–36.*

* cited by examiner

*Primary Examiner*—Michael J. Feely
(74) *Attorney, Agent, or Firm*—John J. Piskorski

(57) ABSTRACT

Disclosed are electrolyte compositions for depositing tin or tin-alloys at various current densities. Also disclosed are methods of plating such tin or tin-alloys on substrates, such as the high speed tin plating of steel.

16 Claims, 1 Drawing Sheet

PRIOR ART

TIN ELECTROLYTE

Matter enclosed in heavy brackets [ ] appears in the original patent but forms no part of this reissue specification; matter printed in italics indicates the additions made by reissue.

BACKGROUND OF THE INVENTION

This invention relates generally to the field of plating metal on a substrate. In particular, the present invention relates to electrolyte compositions and methods for depositing tin.

Electroplating baths for depositing tin, lead, or their alloys have been used for many years in electroplating equipment. High speed electroplating equipment and processes are well-known in the industry and generally consist of directing the work to be plated into the electroplating cell from one end, allowing the work to proceed through the electroplating cell and exit thereafter the cell at the other end. The electroplating solution is removed or overflows the electroplating cell into a reservoir and the solution is pumped from the reservoir back into the electroplating cell to provide vigorous agitation and solution circulation. Many variations of these electroplating cells can exist, but the general features are as described.

There are a number of desirable features that the electroplating solution should possess for improved operation in this type of equipment or processing, as follows. The solution must be able to electroplate the desired deposit at the high speeds required. The solution must deposit tin which meets the solderability or reflow requirements of the specific application. The solution should be stable and the additives in the solution must withstand exposure to the strong acid solution as well as to the introduction of air, which would take place as a result of the vigorous solution movement in high speed plating machines. The solution should remain clear and free from turbidity, even at elevated temperatures such as 120 to 130° F. or higher. Due to the high current densities involved it is often advantageous to operate these solutions at an elevated temperature. The additives used must be of a type that will not turn the solution turbid at such elevated temperatures.

Due to the vigorous solution movement and solution mixing with air in such high speed plating processes, there is a strong tendency to produce a foam which is detrimental to the electroplating process. Under extreme conditions, this foam can build up in the reservoir tank with resultant overflow onto the floor, thereby losing a large quantity of solution to the waste stream. Foam can also interfere with the operation of the pump that is being used to generate agitation. Arcing between the anode and cathode is also possible due to the presence of foam. Thus, the additives used in the electroplating solutions should not generate foam in the plating equipment.

Many electrolytes have been proposed for electroplating tin, lead, and tin/lead alloys. For example, U.S. Pat. No. 5,174,887 (Federman et al.) discloses a process for the high speed electroplating of tin having as a surfactant an alkylene oxide condensation product of an organic compound having at least one hydroxy group and 20 carbon atoms or less. The organic compounds include an aliphatic hydrocarbon of between 1 and 7 carbon atoms, an unsubstituted aromatic compound or an alkylated aromatic compound having 6 carbon atoms or less in the alkyl moiety.

U.S. Pat. No. 5,871,631 (Ichiba et al.) discloses a divalent tin salt of an organic sulfonic acid, an antioxidant, and a brightening agent having an additive ingredient (A) prepared by adding propylene oxide to polyoxyethylene glycol and having an average molecular weight ranging from 3000 to 18000; and an additive ingredient (B) prepared by adding propylene oxide to polyoxyethylene glycol and having an average molecular weight ranging from 300 to 1500; where the weight ratio of (A) to (B) is from 97/3 to 40/60.

During use, a high speed tinplate line may slow down, such as when a new metal coil is welded to the end of the metal strip that is being plated. During such slow down periods the rate at which the metal substrate passes through the electroplating bath slows down. Theoretically, in order to maintain a consistent tin or tin-alloy deposit thickness, i.e. coating weight, the plating bath must be run at a lower current density. However, current tin and tin-alloy high speed electroplating baths, including those discussed above, fail to produce a consistent appearance of tin or tin-alloy over a sufficiently wide current density range to allow for such slow down periods.

There is thus a continuing need for plating baths that will deposit tin or tin-alloys over a wide current density range while maintaining a uniform deposit appearance over the current density range, particularly for use in high speed plating systems.

SUMMARY OF THE INVENTION

It has been surprisingly found that tin or tin-alloy may be uniformly deposited over a wide current density range using the electrolyte compositions of the present invention. It has been further surprisingly found that the electrolyte compositions of the present invention plate tin or tin-alloy at high current densities with low metal concentrations, while producing a uniform deposit appearance over the entire current density range.

In a first aspect, the present invention provides an electrolyte composition for depositing tin or tin-alloy on a substrate, including one or more tin compounds, one or more acidic electrolytes, one or more alkylene oxide compounds, one or more polyalkylene glycols and optionally one or more additives.

In a second aspect, the present invention provides a method for depositing tin or tin-alloy on a substrate including the steps of contacting the substrate with the electrolyte composition described above and applying a sufficient current density to the electrolyte composition to deposit the tin or tin-alloy on the substrate.

In a third aspect, the present invention provides a substrate having a tin or tin-alloy deposited thereon according to the method described above.

In a fourth aspect, the present invention provides a method for high speed electroplating of tin or tin-alloys including the steps of: a) utilizing high speed electroplating equipment comprising an electroplating cell; an overflow reservoir adjacent the cell; means for returning solution from the reservoir to the electroplating cell; means for directing a substrate to be plated from an entry point at one end of the cell to an exit at a second end of the cell; b) introducing an electrolyte including a basis solution of one or more tin compounds, one or more acidic electrolytes, one or more alkylene oxide compounds, one or more polyalkylene glycols and optionally one or more additive; and c) continuously electroplating substrates with tin or tin-alloy at a sufficient current density and at a sufficient temperature for high speed electroplating as the substrates pass through the electroplating solution within the cell.

DETAILED DESCRIPTION OF THE INVENTION

Figure 1:
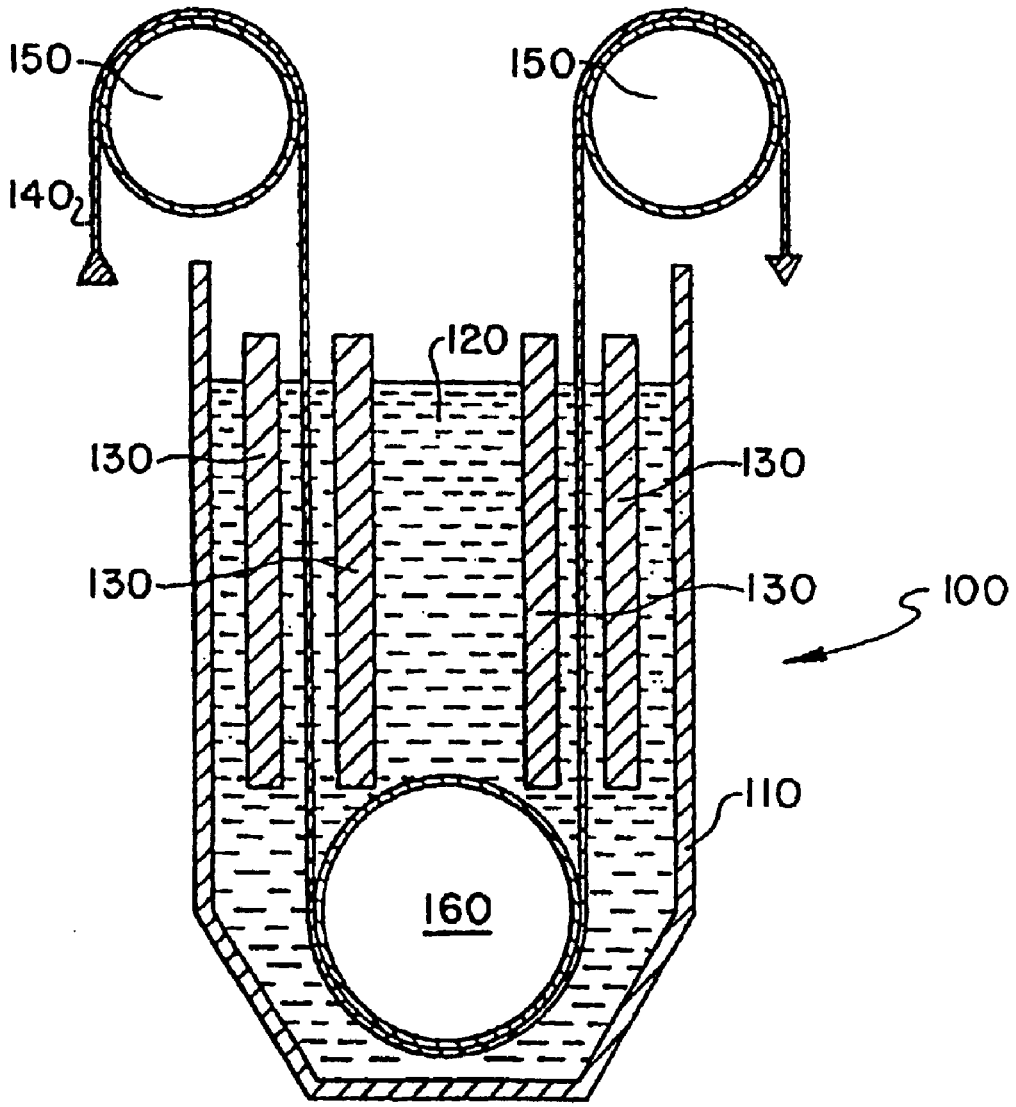
FIG. 1 is a cross-sectional view of an electroplating cell for depositing tin on a metal strip.

As used throughout this specification, the following abbreviations shall have the following meanings, unless the context clearly indicates otherwise: ° C.=degrees Centigrade; ° F.=degrees Fahrenheit; g=gram; L=liter; mL=milliliter; wt %=percent by weight; ppm=parts per million; "=inches; cm=centimeters; rpm=revolutions per minute; and ASF=amps per square foot. The terms "depositing" and "plating" are used interchangeably throughout this specification. "Halide" refers to fluoride, chloride, bromide and iodide. "Alkyl" refers to linear, branched and cyclic alkyl. All percentages are by weight, unless otherwise noted. All numerical ranges are inclusive and combinable.

The electrolyte compositions of the present invention include one or more tin compounds, one or more acidic electrolytes, one or more alkylene oxide compounds, one or more polyalkylene glycols and optionally one or more additives to enhance the efficiency and/or quality of the plating.

The one or more tin compounds useful in the present invention are any solution soluble tin compound. Suitable tin compounds include, but are not limited to salts, such as tin halides, tin sulfates, tin alkane sulfonate such as tin methane sulfonate, tin aryl sulfonate such as tin phenyl sulfonate and tin toluene sulfonate, tin alkanol sulfonate, and the like. When tin halide is used, it is preferred that the halide is chloride. It is preferred that the tin compound is tin sulfate, tin chloride, tin alkane sulfonate or tin aryl sulfonate, and more preferably tin sulfate or tin methane sulfonate. The tin compounds useful in the present invention are generally commercially available from a variety of sources and may be used without further purification. Alternatively, the tin compounds useful in the present invention may be prepared by methods known in the literature.

The amount of tin compound useful in the electrolyte compositions of the present invention is any amount that provides a tin content typically in the range of 5 to 100 g/L, and preferably 10 to 70 g/L. When the compositions of the present invention are used in a low speed plating process, the amount of tin present in the electrolyte composition is typically in the range of 5 to 40 g/L, and preferably 10 to 20 g/L. When the compositions of the present invention are used in a high speed plating process, the amount of tin present in the electrolyte composition is typically in the range of 20 to 100 g/L, and preferably 50 to 70 g/L. When the compositions of the present invention are used in high speed tin plating of steel, the amount of tin is typically in the range of 5 to 50 g/L, and preferably 10 to 30 g/L. Mixtures of tin compounds may also be used advantageously in the present invention, provided that the total amount of tin is in the range of from 5 to 100 g/L.

Any acidic electrolyte that is solution soluble and does not otherwise adversely affect the electrolyte composition may be used advantageously in the present invention. Suitable acidic electrolytes include, but are not limited to alkane sulfonic acids, such as methane sulfonic acid, aryl sulfonic acids such as phenyl sulfonic acid or toluene sulfonic acid, sulfuric acid, sulfamic acid, hydrochloric acid, hydrobromic acid and fluoroboric acid. Mixtures of acidic electrolytes are particularly useful, such as, but not limited to, mixtures of alkane sulfonic acids and sulfuric acid. Thus, more than one acidic electrolyte may be used advantageously in the present invention. The acidic electrolytes useful in the present invention are generally commercially available and may be used without further purification. Alternatively, the acidic electrolytes may be prepared by methods known in the literature.

Typically, the amount of acidic electrolyte is in the range of 10 to 400 g/L, and preferably 100 to 200 g/L. When the compositions of the present invention are used in the high speed tin plating of steel, the acidic electrolyte is typically present in an amount in the range of 20 to 80 g/L, and preferably 30 to 60 g/L. It is preferred that when the tin compound is a halide that the acidic electrolyte is the corresponding acid. For example, when tin chloride is used in the present invention, it is preferred that the acidic electrolyte is hydrochloric acid.

The one or more alkylene oxide compounds useful in the present invention are any which yield deposits having good solderability, good matte or lustrous finish with satisfactory grain refinement, are stable in the acidic electroplating bath, electroplate at high speeds, are substantially low foaming, and provide a cloud point of the bath above about 110° F. (43° to 44° C.). It is preferred that the alkylene oxide compounds provide no foam to the bath during the electroplating process. Suitable alkylene oxide compounds include, but are not limited to, ethylene oxide/propylene oxide ("EO/PO") copolymers, alkylene oxide condensation products of an organic compound having at least one hydroxy group and 20 carbon atoms or less, compounds prepared by adding oxypropylene to polyoxyethylene glycol, and the like. Typically, the EO/PO copolymers have an average molecular weight in the range of from about 500 to about 10,000, and preferably from about 1000 to about 5000. It is preferred that the alkylene oxide compound is an EO/PO copolymer.

Suitable alkylene oxide condensation products of an organic compound having at least one hydroxy group and 20 carbon atoms or less include those having an aliphatic hydrocarbon of from one to seven carbon atoms, an unsubstituted aromatic compound or an alkylated aromatic compound having about six carbon atoms or less in the alkyl moiety, such as those disclosed in U.S. Pat. No. 5,174,887, herein incorporated by reference to the extent it teaches the preparation and use of these compounds. The aliphatic alcohols may be saturated or unsaturated. Suitable aromatic compounds are those having up to two aromatic rings. The aromatic alcohols typically have up to 20 carbon atoms prior to derivatization with ethylene oxide ("EO"). Such aliphatic and aromatic alcohols may be further substituted, such as with sulfate or sulfonate groups. Such suitable alkylene oxide compounds include, but are not limited to: ethyloxylated polystyrenated phenol having 12 moles of EO, ethyloxylated butanol having 5 moles of EO, ethyloxylated butanol having 16 moles of EO, ethyloxylated butanol having 8 moles of EO, ethyloxylated octanol having 12 moles of EO, ethyloxylated beta-naphthol having 13 moles of EO, ethyloxylated bisphenol A having 10 moles of EO, ethyloxylated sulfated bisphenol A having 30 moles of EO and ethyloxylated bisphenol A having 8 moles of EO.

Typically, the one or more alkylene oxide compounds are present in the electrolyte compositions of the present invention in an amount of from 0.1 to 15 mL/L, and preferably 0.5 to 10 mL/L.

The one or more polyalkylene glycols useful in the present invention are any which are compatible with the electrolyte composition, yield deposits having good solderability, good matte or lustrous finish with satisfactory grain refinement, are stable in the acidic electroplating bath, electroplate at high speeds, are substantially low foaming, and provide a cloud point of the bath above about 110° F. (43° to 44° C.). It is preferred that the alkylene oxide compounds provide no foam to the bath during the electroplating process. Suitable polyalkylene glycols include, but are not limited to, polyethylene glycol and polypropylene glycol, and preferably polyethylene glycol. Such polyalkylene glycols are generally commercially available from a variety of sources and may be used without further purification.

Typically, the polyalkylene glycols useful in the present invention are those having an average molecular weight in the range of from about 200 to about 1000,000, and preferably from about 900 to about 20,000. Such polyalkylene glycols are present in the electrolyte compositions of the present invention in an amount of from about 0.1 to about 15 g/L, preferably from about 0.25 to about 10 g/L, and more preferably from about 0.5 to about 8 g/L.

It will be appreciated by those skilled in the art that one or more other metal compounds may be combined with the electrolyte composition of the present invention. Such other metal compounds are necessary for the plating of tin-alloys. Suitable other metals include, but are not limited to, lead, nickel, copper, bismuth, zinc, silver, indium and the like. The other metal compounds useful in the present invention are any which provide the metal to the electrolyte composition in a soluble form. Thus, the metal compounds include, but are not limited to, salts, such as metal halides, metal sulfates, metal alkane sulfonate such as metal methane sulfonate, metal aryl sulfonate such as metal phenyl sulfonate and metal toluene sulfonate, metal alkanol sulfonate, and the like. The choice of other metal compound and the amount of such other metal compound present in the electrolyte composition depends upon the tin-alloy to be deposited, and is well known to those skilled in the art.

It will be appreciated by those skilled in the art that one or more other additives may be combined with the electrolyte composition of the present invention, such as reducing agents, grain refiners such as hydroxy aromatic compounds and other wetting agents, brightening agents and the like. Mixtures of additives may also be used in the present invention.

Reducing agents may be added to the electrolyte composition of the present invention to assist in keeping the tin in a soluble, divalent state. Suitable reducing agents include, but are not limited to, hydroquinone and hydroxylated aromatic compounds, such as resorcinol, catechol, and the like. Such reducing agents are disclosed in U.S. Pat. No. 4,871,429, herein incorporated by reference to the extent it teaches the preparation and use of such compounds. The amount of such reducing agent is well known to those skilled in the art, but is typically in the range of from about 0.1 g/L to about 5 g/L.

Bright deposits may be obtained by adding brighteners to the electrolyte compositions of the present invention. Such brighteners are well known to those skilled in the art. Suitable brighteners include, but are not limited to aromatic aldehydes such as chlorobenzaldehyde, derivatives of aromatic aldehydes such as benzal acetone, and aliphatic aldehydes such as acetaldehyde or glutaraldehyde. Such brighteners are typically added to the compositions of the present invention to improve the appearance and reflectivity of the deposit. Typically, brighteners are used at an amount of 0.5 to 3 g/L, and preferably 1 to 2 g/L.

It will be appreciated by those skilled in the art that hydroxy aromatic compounds or other wetting agents may be added to the electrolyte compositions of the present invention to provide further grain refinement. Such grain refiners may be added to the electrolyte composition of the present invention to further improve deposit appearance and operating current density range. Suitable other wetting agents include, but are not limited to: alkoxylates, such as the polyethoxylated amines JEFFAMINE T-403 or TRITON RW, or sulfated alkyl ethoxylates, such as TRITON QS-15, and gelatin or gelatin derivatives. The amounts of such grain refiners useful in the present invention are well known to those skilled in the art and typically are in the range of 0.01 to 20 mL/L, preferably 0.5 to 8 mL/L, and more preferably 1 to 5 mL/L.

Which optional additives, if any, are added to the electrolyte compositions of the present invention depends upon the results and types of deposits desired. It will be clear to one skilled in the art which additives and in what amounts are needed to achieve the desired finished deposit.

Electroplating baths containing the electrolyte compositions of the present invention are typically prepared by adding to a vessel one or more acidic electrolytes, followed by one or more tin compounds, one or more alkylene oxide compounds, one or more polyalkylene glycols and then one or more other additives. Other orders of addition of the components of the compositions of the present invention may be used. Once the bath is prepared, undesired material is removed, such as by filtration, and then water is added to adjust the final volume of the bath. The bath may be agitated by any known means, such as stirring, pumping, sparging or jetting the solution, for increased plating speed.

The electrolyte compositions of the present invention and plating baths prepared therefrom typically are acidic, i.e. having a pH of less than 7, typically less than 1. An advantage of the electrolyte compositions of the present invention is that pH adjustment of the electroplating bath is not necessary.

The electrolyte compositions of the present invention are useful in any plating method where a tin or tin-alloy deposit is desired. Suitable plating methods include, but are not limited to barrel plating, rack plating and high speed plating. A tin or tin-alloy deposit may be plated on a substrate by the steps of contacting the substrate with the electrolyte composition described above and passing a current through the electrolyte to deposit the tin or tin-alloy on the substrate. Any substrate that can be electrolytically plated with a metal is suitable for plating according to the present invention. Suitable substrates include, but are not limited to: steel, copper, copper alloys, nickel, nickel alloys, nickel-iron containing materials, electronic components, plastics, and the like. Suitable plastics include plastic laminates, such as printing wiring boards, particularly copper clad printed wiring boards. The electrolyte compositions of the present invention are particularly suitable for electroplating of steel, particularly in high speed electroplating processes.

The substrate to be plated may be contacted with the electrolyte composition in any manner known in the art. Typically, the substrate is placed in a bath containing the electrolyte composition of the present invention.

Typically, the current density used to plate the tin or tin-alloy of the present invention is in the range of, but not limited to, 1 to 2000 ASF. When a low speed electroplating process is used, the current density is typically in the range of 1 to 40 ASF, and preferably 1 to 30 ASF. When a high speed electroplating process is used, the current density is typically in the range of 50 to 2000 ASF, and preferably 100 to 1500 ASF. For example, when the electrolyte compositions of the present invention are used to deposit tin on steel in a high speed plating processes, a suitable current density is 100 to 600 ASF, resulting in a tin deposit having a thickness of typically from 5 to 100 microinches.

Typically, the tin or tin-alloy of the present invention may be deposited at a temperature in the range of, but not limited to, 60° to 150° F. (15° to 66° C.) or higher, and preferably 70° to 125° F. (21° to 52° C.), and more preferably 75° to 120° F. (23° to 49° C.).

In general, the length of time a substrate remains in a plating bath containing the electrolyte compositions of the present invention is not critical. Longer times typically result in thicker deposits while shorter times typically result in thinner deposits, for a given temperature and current density. Thus, the length of time a substrate remains in a plating bath may be used to control the thickness of the resulting deposit.

The electrolyte compositions of the present invention are particularly useful for depositing tin, but may also be used to deposit tin-alloy containing 60 to 99.5 wt % tin and 0.5 to 40 wt % other metals, based on the weight of the alloy, as measured by either atomic adsorption spectroscopy ("AAS") or inductively coupled plasma ("ICP").

A further advantage of the electrolyte compositions of the present invention is that they may be successfully used to deposit tin or tin-alloy in a high speed electroplating process. The term "high speed electroplating" refers to those processes which operated at a current density about 50 ASF or greater using the above described equipment. Typical current densities are in the range of 50 to 2000 ASF or higher, preferably 100 to 1500 ASF, and more preferably 200 to 500 ASF. Typically, such processes also operate above a temperature of about 70° F. (21° C.). Suitable temperatures include, but are not limited to, those in the range of 70° to 140° F. (21° to 60° C.) or higher, preferably greater than 85° F. (29° C.), and more preferably greater than 95° F. (35° C.).

The electrolyte compositions of the present invention are particularly suitable for tin electroplating of steel, particularly in high speed electroplating processes. When the compositions of the present invention are used in high speed tin plating steel, the amount of tin is typically in the range of 5 of 50 g/L, and preferably 10 to 30 g/L. The acidic electrolyte is typically present in such compositions in an amount in the range of 20 to 80 g/L, and preferably 30 to 60 g/L. Current densities of 100 to 600 ASF are suitable for the high speed tin plating of steel according to the present invention. Suitable temperatures include, but are not limited to, those in the range of 70° to 140° F. (21° to 60° C.) or higher, preferably greater than 85° F. (29° C.), and more preferably greater than 95° F.

Such a method for high speed electroplating of tin or tin-alloys, such as on steel, includes the steps of: a) utilizing high speed electroplating equipment comprising an electroplating cell; an overflow reservoir adjacent the cell; means for returning solution from the reservoir to the electroplating cell; means for directing a substrate to be plated from an entry point at one end of the cell to an exit at a second end of the cell; b) introducing an electrolyte including a basis solution of one or more tin compounds, one or more acidic electrolytes, one or more alkylene oxide compounds, one or more polyalkylene glycols and optionally one or more additives; and c) continuously electroplating substrates with tin or tin-alloy at a sufficient current density and at a sufficient temperature for high speed electroplating as the substrates pass through the electroplating solution within the cell.

The returning means may be any known means, such as tubes, hoses, conduits, pumps, drains and the like. The directing means may be any known means, such as conveyors, belts, rollers, robot arms and the like.

The high speed electroplating process of the present invention may be performed using any of a variety of high speed electroplating equipment. Such high speed electroplating equipment is well known to those skilled in the art, such as, for example, that disclosed in U.S. Pat. No. 3,819,502, herein incorporated by reference to the extent it teaches such equipment. One typical apparatus utilizes an electroplating cell as shown in FIG. 1. This cell 100 includes a tank 110 for retaining the electrolyte 120 therein and tin anodes 130 for supplying tin to the electrolyte. Steel strip 140 passes around a conductor roll 150 and downwardly into the cell 110 between tin anodes 130. As the strip 140 passes downwardly between the anodes 130, a tin coating begins to deposit thereon. Thereafter, strip 140 passes around sink roll 160 located near the bottom of the cell 100 and then passes upwardly between additional anodes 130 for receiving additional tin deposition before exiting the cell. Thereafter, strip 140 passes around another conductor roll 150 and into an adjacent cell. A plurality of such cells are utilized in a tin-plate production machine to deposit the appropriate amount of tin coating on the steel strip.

Although not shown in the figure, the plating electrolyte is continuously circulated between the system and a storage tank. The solution is primarily pumped into the bottom of each cell. The solution in each cell is maintained at the appropriate level by the use of an overflow. Solution collected from the overflow is directed to the storage tank for recirculation.

After exiting the last cell, the strip passes through electrolyte recovery and rinsing stations. Recovered electrolyte is directed to the storage tank for recirculation. Rinsing is conducted in a second tank by a system of hot water sprays and wringer rolls. Finally, the tinplate is dried by passing through an air dryer to complete the electroplating operation. When a bright deposit is desired, the tinplate is subject to conventional reflow processing.

The following examples are intended to illustrate further various aspects of the present invention, but are not intended to limit the scope of the invention in any aspect.

EXAMPLE 1

An electrolyte composition was prepared containing 15 g/L tin from tin methane sulfonate, 40 g/L free methane sulfonic acid, 1 g/L sulfuric acid, 0.5 g/L of an EO/PO copolymer having an average molecular weight of 2200, 0.5 g/L polyethylene glycol having an average molecular weight of 6000, and 0.25 g/L of a reducing agent. An electrolyte bath was prepared by combining the electrolyte composition with water to provide the desired volume.

A steel panel, 6"×2.5" (15.24 cm×6.35 cm), was wrapped around a conductive mandrel and rotated at a speed of 1500 rpm in the electrolyte at a temperature of 40° C. The panel was then electroplated using a current density of 300 ASF to deposit a tin coating approximately 50 microinches thick. The steel panel was subsequently rinsed, dried and the deposit was reflowed to produce a brilliant, reflective tin coating.

EXAMPLE 2

An electrolyte composition was prepared containing 20 g/L tin from tin methane sulfonate, 30 g/L free methane sulfonic acid, 1 g/L sulfuric acid, 1.5 g/L of an EO/PO copolymer having an average molecular weight of 2200, 0.5 g/L of a polyethylene glycol having an average molecular weight of 14,000, and 1.0 g/L of a reducing agent. An electrolyte bath was prepared by combining the electrolyte composition with water to provide the desired volume and operated at a temperature of 130° F.

The electrolyte composition was placed in a Hull cell and a steel panel was electroplated using 3 amperes. The resultant panel had a smooth, uniform, matte tin deposit from the low current density edge to approximately ¾" (1.9 cm) from the high current density edge.

EXAMPLE 3

An electrolyte composition was prepared containing 50 g/L tin from tin methane sulfonate, 100 g/L free methane sulfonic acid, 1.0 g/L of an EO/PO copolymer having an average molecular weight of 2200, 1.0 g/L of a polyethylene glycol having an average molecular weight of 14000, 0.5 g/L of a reducing agent, and 0.1 g/L of a grain refiner. An electrolyte bath was prepared by combining the electrolyte composition with water to provide the desired volume and operated at a temperature of 110° F.

The electrolyte composition was placed in a Hull cell and a steel panel was electroplated using 5 amperes. The resultant panel had a smooth, uniform, matte tin deposit from the low current density edge to approximately ¾" (1.9 cm) from the high current density edge.

What is claimed is:

[1. An electrolyte composition for depositing tin or tin-alloy on a substrate, comprising one or more tin compounds, one or more acidic electrolytes, one or more alkylene oxide compounds, one or more polyalkylene glycols and one or more reducing agents.]

[2. The electrolyte composition of claim 1 wherein the tin compound is selected from tin halides, tin sulfates, tin alkane sulfonate, tin aryl sulfonate, or tin alkanol sulfonate.]

3. The electrolyte composition of claim [1] *20* wherein the tin compound is present in an amount *to provide tin* in the range of from 5 to 100 g/L.

4. The electrolyte composition of claim [1] *20* wherein the acidic electrolyte is selected from alkane sulfonic acid, aryl sulfonic acids, sulfuric acid, sulfamic acid, hydrochloric acid, hydrobromic acid and fluoroboric acid.

5. The electrolyte of claim [1] *20* wherein the acidic electrolyte is present in an amount in the range of 10 to 400 g/L.

[6. The electrolyte composition of claim 1 wherein the alkylene oxide compound is selected from ethylene oxide/propylene oxide block copolymers, alkylene oxide condensation products of an organic compound having at least one hydroxy group and 20 carbon atoms or less, or compounds prepared by adding oxypropylene to polyoxyethylene glycol.]

[7. The electrolyte composition of claim 1 wherein the alkylene oxide compound has an average molecular weight of from about 500 to about 10,000.]

8. The electrolyte composition of claim [1] *20* wherein the [alkylene-oxide compound is]*ethylene oxide/propylene oxide copolymers are* present in an amount of from 0.1 to 15 mL/L.

9. The electrolyte composition of claim [1] *20* wherein the polyalkylene glycol is selected from polyethylene glycol or polypropylene glycol.

10. The electrolyte composition of claim [1] *20* wherein the polyalkylene glycol has [an] *a weight* average molecular weight of from about 200 to about 100,000.

11. The electrolyte composition of claim 10 wherein the polyalkylene glycol is present in an amount of from 0.1 to 15 g/L.

12. The electrolyte composition of claim [1] *20* further [comprising] *including* water.

13. The electrolyte composition of claim [1] *20* further [comprising] *including* one or more additives from grain refiners or brightening agents.

14. The electrolyte composition of claim [1] *20* wherein the one or more reducing agents are selected from hydroquinone, resorcinol or catechol.

15. A method for depositing tin or tin-alloy on a substrate comprising the steps of contacting the substrate with the electrolyte composition of claim [1] *20* and applying a sufficient current density to the electrolyte composition to deposit the tin or tin-alloy on the substrate.

16. The method of claim 15 wherein the current density is in the range of 1 to 2000 ASF.

[17. A method for high speed electroplating of tin or tin-alloys comprising the steps of: a) utilizing high speed electroplating equipment comprising an electroplating cell; an overflow reservoir adjacent the cell; means for returning solution from the reservoir to the electroplating cell; means for directing a substrate to be plated from an entry point at one end of the cell to an exit at a second end of the cell; b) introducing an electrolyte including a basis solution of one or more tin compounds, one or more acidic electrolytes, one or more alkylene oxide compounds, one or more polyalkylene glycols, and one or more reducing agents; and c) continuously electroplating substrates with tin or tin-alloy at a sufficient current density and at a sufficient temperature for high speed electroplating as the substrates pass through the electroplating solution within the cell.]

18. The method of claim [17] *21* wherein the one or more reducing agents are selected from hydroquinine, resorcinol or catechol.

[19. An electrolyte composition for depositing tin or tin-alloy on a substrate, comprising one or more tin compounds selected from tin halides, tin sulfates, tin alkane sulfonates, tin aryl sulfonates, or tin alkanol sulfonates; one or more acidic electrolytes selected from alkane sulfonic acids, aryl sulfonic acids, sulfuric acid, sulfamic acid, hydrochloric acid, hydrobromic acid and fluoroboric acid; one or more alkylene oxide compounds selected from ethylene oxide/propylene oxide block copolymers, alkylene oxide condensation products of an organic compound having at least one hydroxy group and 20 carbon atoms or less, or compounds prepared by adding oxypropylene to polyoxyethylene glycol, wherein each of the alkylene oxide compounds has an average molecular weight of from about 500 to about 10,000; one or more polyalkylene glycols selected from polyethylene glycol or polypropylene glycol, wherein each polyalkylene glycol has an average molecular weight of from about 200 to about 100,000; and one or more reducing agents.]

*20. An electrolyte composition for depositing tin or tin-alloy on a substrate, consisting essentially of one or more tin compounds selected from the group consisting of tin sulfates, tin alkane sulfonate, tin aryl sulfonate, and tin alkanol sulfonate, one or more acidic electrolytes, one or more ethylene oxide/propylene oxide copolymers with a weight average molecular weight of from about 1000 to about 5000, one or more polyalkylene glycols having a weight average molecular weight of about 200 to about 100,000 and one or more reducing agents.*

*21. A method for high speed electroplating of tin or tin-alloys comprising the steps of: a) utilizing high speed electroplating equipment comprising an electroplating cell; an overflow reservoir adjacent the cell; means for returning solution from the reservoir to the electroplating cell; means for directing a substrate to be plated from an entry point at one end of the cell to an exit at a second end of the cell; b) introducing an electrolyte including a basis solution of one or more tin compounds, one or more acidic electrolytes, one or more ethylene oxide/propylene oxide copolymers with a*

*weight average molecular weight of from about 1000 to about 5000, one or more polyalkylene glycols having a weight average molecular weight of about 200 to about 100,000, and one or more reducing agents; and c) continuously electroplating substrates with tin or tin-alloy at a sufficient current density and at a sufficient temperature for high speed electroplating as the substrates pass through the electroplating solution within the cell.*

*22. An electrolyte composition for depositing tin or tin-alloy on a substrate, consisting essentially of one or more tin compounds selected from tin sulfates, tin alkane sulfonates, tin aryl sulfonates, and tin alkanol sulfonates; one or more acidic electrolytes selected from alkane sulfonic acids, aryl sulfonic acids, sulfuric acid, sulfamic acid, hydrochloric acid, hydrobromic acid and fluoroboric acid; one or more ethylene oxide/propylene oxide block copolymers with a weight average molecular weight of from about 1000 to about 5000, alkylene oxide condensation products of an organic compound having at least one hydroxyl group and 20 carbon atoms or less and having a weight average molecular weight of from about 500 to about 10,000, or alkylene oxide compounds prepared by adding oxypropylene to polyoxyethylene glycol having a weight average molecular weight of from about 500 to about 10,000; one or more polyalkylene glycols selected from polyethylene glycol or polypropylene glycol, wherein each polyalkylene glycol has a weight average molecular weight of from about 200 to about 100,000; and one or more reducing agents.*

* * * * *